(12) United States Patent
Kirk, Jr. et al.

(10) Patent No.: US 6,776,380 B1
(45) Date of Patent: Aug. 17, 2004

(54) METHOD AND APPARATUS FOR ADJUSTABLY MOUNTING A FURNITURE LEG ON AN ARTICLE OF FURNITURE

(76) Inventors: Charles E. Kirk, Jr., 122 Forest Gate Rd., Ripley, MS (US) 38663; Joy B. Kirk, 122 Forest Gate Rd., Ripley, MS (US) 38663

( * ) Notice: Subject to any disclaimer, the term of this patent is extended or adjusted under 35 U.S.C. 154(b) by 0 days.

(21) Appl. No.: 10/300,294

(22) Filed: Nov. 19, 2002

(51) Int. Cl.[7] ............................................... F16M 11/16
(52) U.S. Cl. ................ 248/188; 248/188.2; 248/188.3; 248/188.4; 403/382; 403/403; 403/401; 16/19
(58) Field of Search ................................. 248/188, 151, 248/225.11, 188.2, 188.3, 188.4, 188.8, 346.11, 168, 649; 297/463.1; 403/382, 403, 401; 29/91; 16/19; 108/156, 158

(56) References Cited

U.S. PATENT DOCUMENTS

| | | | | |
|---|---|---|---|---|
| 772,462 A | * | 10/1904 | Guender | 248/188 |
| 835,582 A | * | 11/1906 | Tobey | 312/107 |
| 2,725,667 A | * | 12/1955 | Ingarra | 248/188.4 |
| 2,970,025 A | * | 1/1961 | Wilson | 403/219 |
| 3,134,566 A | * | 5/1964 | Beene | 248/188.8 |
| 3,399,912 A | * | 9/1968 | Maspero | 403/217 |
| 3,406,935 A | * | 10/1968 | Mutchnik et al. | 248/188 |
| 3,443,530 A | * | 5/1969 | Carlson | 108/156 |
| 3,504,877 A | * | 4/1970 | Lyon, Sr. | 248/188 |
| 3,620,492 A | * | 11/1971 | Jennings | 248/188 |
| 3,957,239 A | | 5/1976 | Slaats et al. | |
| 4,003,537 A | * | 1/1977 | Mutchnik | 248/425 |
| 4,032,242 A | * | 6/1977 | Morris | 403/231 |
| 4,124,186 A | | 11/1978 | Call, Sr. | |
| 4,396,173 A | | 8/1983 | Call, Sr. | |
| 4,508,478 A | | 4/1985 | Leistner | |
| 4,549,711 A | * | 10/1985 | Giltnane | 248/188 |
| 4,745,867 A | * | 5/1988 | Niemiec | 108/158 |
| 5,312,078 A | * | 5/1994 | Marsh | 248/220.1 |
| 5,720,457 A | | 2/1998 | Miller et al. | |
| 5,791,612 A | | 8/1998 | King | |
| 5,820,089 A | | 10/1998 | Lim | |
| 5,934,630 A | | 8/1999 | Williams et al. | |
| 5,957,418 A | * | 9/1999 | Nelson | 248/188 |
| 5,971,341 A | | 10/1999 | Pfister | |
| 6,016,756 A | | 1/2000 | McMahon et al. | |
| 6,082,822 A | | 7/2000 | Kelly et al. | |
| 6,095,463 A | | 8/2000 | McCormick | |
| 6,547,196 B2 | * | 4/2003 | Binnebose et al. | 248/188 |
| 2002/0043596 A1 | | 4/2002 | Forsberg | |

FOREIGN PATENT DOCUMENTS

DE          3838304 A1 *  5/1990  ............ A47B/3/08

* cited by examiner

Primary Examiner—Kimberly Wood
(74) Attorney, Agent, or Firm—Garvey, Smith, Nehrbass & Doody, LLC; Charles C. Garvey, Jr.

(57) ABSTRACT

A furniture article of improved construction includes a furniture frame having a portion that is receptive of a bracket having a configuration that enables attaching a leg thereto in an adjustable way. Each of the legs that attaches to the furniture frame attaches to a single of the brackets. A plurality of the brackets can be attached to the frame. Each of the brackets has a slot that receives a connector (e.g. internally threaded nut), the connector traveling in the slot between inner and outer positions. A user can select the position of a leg relative to the furniture frame by attaching the leg to the nut using a threaded fastener for example, and sliding the nut and leg relative to the bracket and frame until a selected position is reached. Further tightening of the leg relative to the nut and bracket affixes the position of the leg relative to the article of furniture in the desired position.

15 Claims, 4 Drawing Sheets

METHOD AND APPARATUS FOR ADJUSTABLY MOUNTING A FURNITURE LEG ON AN ARTICLE OF FURNITURE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the construction of furniture, more particularly to an improved method and apparatus for mounting furniture legs to an article of furniture in an adjustable fashion. Even more particularly, the present invention provides an improved method and apparatus for mounting a furniture leg to an article of furniture, wherein the article of furniture has an upholstered wood frame fitted with a bracket that is attached to the wooden frame of the article of furniture. The bracket provides a slot that carries a connector (e.g. nut). The connector or nut slides within the slot between inner and outer positions. The connector or nut has threads or other connection that enables a connection to be made with a fastener attached to the top of the furniture leg article.

2. General Background of the Invention

In the Furniture Industry, legs come in many sizes shapes and styles. Legs are mounted to furniture (e.g. upholstered furniture) in a variety of different ways. One of the most common is the hanger-bolt and T-nut connection method. A hole is bored in the center of one end of the leg. A hanger-bolt is a known bolt with a lag-bolt thread on one half of the overall length and typically machine thread on the other half. The hanger bolt is driven into the top of the leg leaving the machine thread exposed. The leg is then attached via machine thread into the barrel end of a T-nut. The T-nut is usually a machine threaded nut with a long barrel, a flange, and prongs for locking into the wood.

A hole is bored in the wooden mounting rail of an item of furniture at the precise location for the leg. The barrel of the T-nut is driven into the hole seating the prongs into the upper side of the wood rail. This locks the T-nut in place on the upper side of the wood and exposes the thread of the barrel to the underside of the leg rail or block. The proper structural and aesthetic placement of a leg varies greatly from style to style not only by size of the leg, but also the relationship of the leg to the outside perimeter of the wooden furniture frame.

Typically, the set back of a leg is determined by the alignment of joining of the outside perimeter of the leg with the outside perimeter of the frame. The leg is sometimes placed flush with the wood frame rail or there can be a minimal variation in alignment. In the construction of upholstered furniture, padding and fabric are applied to that same outside rail of the upholstered wooden frame. The desired spacing of the leg from the corner of the wooden frame is typically in the eye of the beholder. This T-nut attachment leg mounting system allows for no leg adjustment. There is also no easy interchange of different size legs.

Manufacturers have over the years have accepted the fact that legs could not be manipulated and have standardized whenever possible to a small extent in the injection molded furniture leg industry.

3. General Discussion of the Present Invention

The present invention provides a method and apparatus for attaching a furniture leg to an article of furniture, featuring a triangular (e.g. injection-molded) corner block with a movable (e.g. sliding)nut or plate having threaded opening that slides in a slot or race at an angle (e.g. 45 degrees) to the front and side of the wooden frame of the furniture article.

The outside or two short sides of this triangular block fasten to the inside corner of two furniture rails providing overall stabilization to the wooden frame and forms a mounting platform for the leg.

The triangular block can be made of metal or injection-molded pieces that allows for the insertion of a metal plate or nut which can contain any size female type connection with thread or pattern to match the male extension of specific leg.

A smaller piece is fitted to the block to define a stop. The smaller piece can be a u-shaped molding that is shaped to wedge or snap into place forming an end stop for the race, retaining the metal plate or nut confined to the slot or race. This smaller stop piece can be removable in order to change the metal plate for other size male connectors.

The triangular block has two sides forming a 90 degree outside angle. A slot in the triangular block forms a 45 degree slide. However this angle could be greater or lesser if used for example with tapered chairs, sofas, or possibly multi-sided tables such as octagon, hexagon, etc.

Screw holes in the prototype are necessary only if the block is screwed into place. Other mounting options certainly could include either stapling and/or gluing.

The size of the triangular block, thickness of walls, grid work, and gussets can be sized and shaped to provide adequate stability to support the weight of the furniture frame, but allow for the height of the leg or the intended use of the furniture article to which it is attached.

The slot or slide thickness, width, and length can be designed to accommodate the diameter of the chosen leg.

Functionality of the block is not limited only to injection molding, but can be of metal or other suitable fabrication.

The present invention provides a furniture upholstering method. Because the block can be raised or lowered vertically with respect to the inside corner rails, the block can be dropped a short distance below the rails to allow spacing for fabric that is pulled under and stapled to the edge of the rail forming an equal lateral plane created by the block and the fabric. This eliminates all the bulk of fabric that typically had to be pulled under the corner and that can cause the leg to be tilted. Fabric thickness has always been a problem with a hanger-bolt and T-nut construction in upholstered furniture. The present invention virtually eliminates tearing of the wood grain when trying to screw on a square type leg. The T-nut typically would hang on the fabric. Staple build up can tear or scar the leg.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

Figure 1:
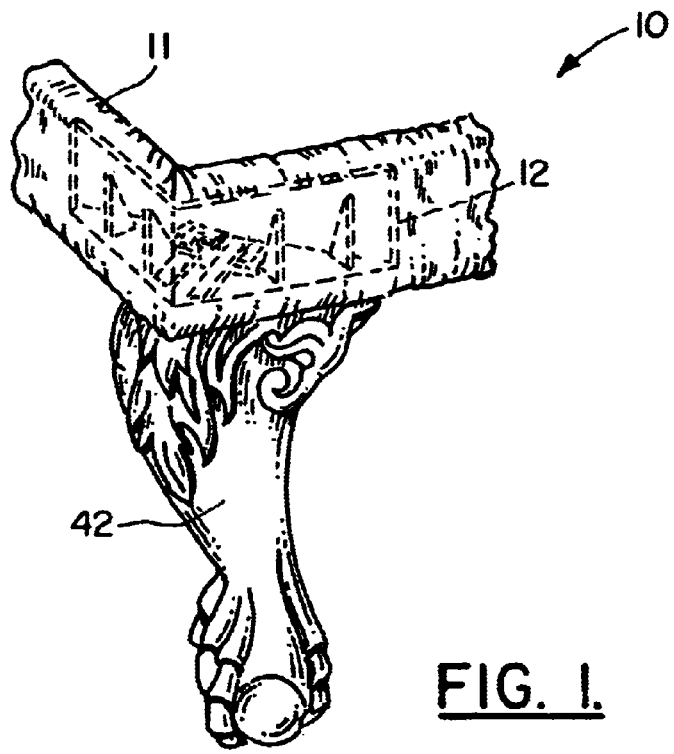
FIG. 1 is a perspective view of a first embodiment of the apparatus of the present invention.

FIGS. 1–4 show generally the first embodiment of the apparatus of the present invention, designed by the numeral 10. Furniture article 10 includes a furniture frame 11 and can be in the form of a chair frame, sofa frame, table frame or the like. The present invention provides not only a new furniture article 10 but also a method of upholstering furniture.

The apparatus of the present invention includes a bracket 12 that has two side panels that each can be rectangular in shape. The side panels 13, 14 are joined to a generally triangularly shaped panel 15. Side panels 13, 14 intersect at corner 16. Edge 17 of triangular panel 15 is generally opposite corner 16.

Triangular panel 15 has a slot 18 that extends from a position next to corner 16 to a position next to edge 17.

Figure 3:
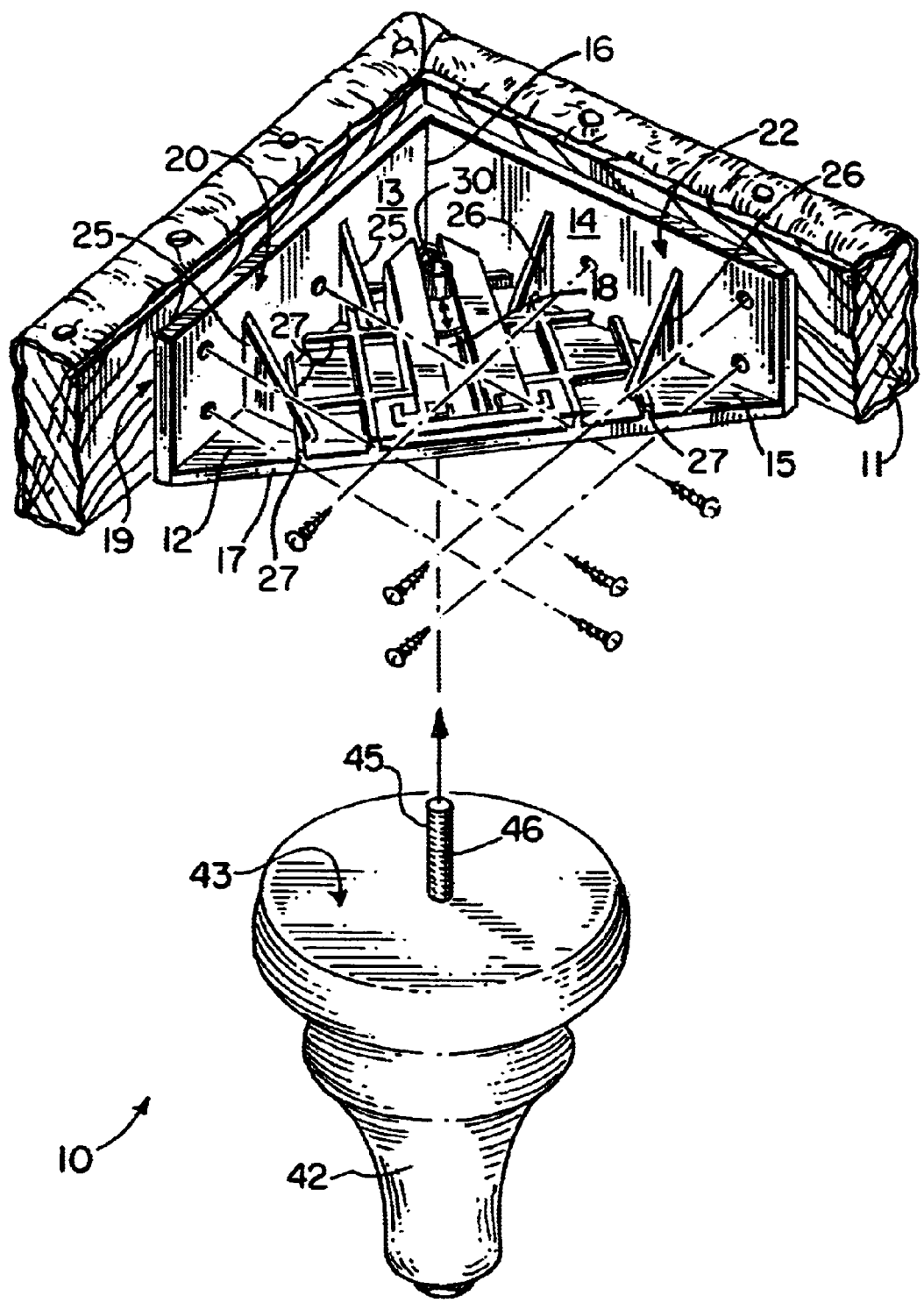
FIG. 3 is a perspective view of the first embodiment of the apparatus of the present invention.
Figure 4:
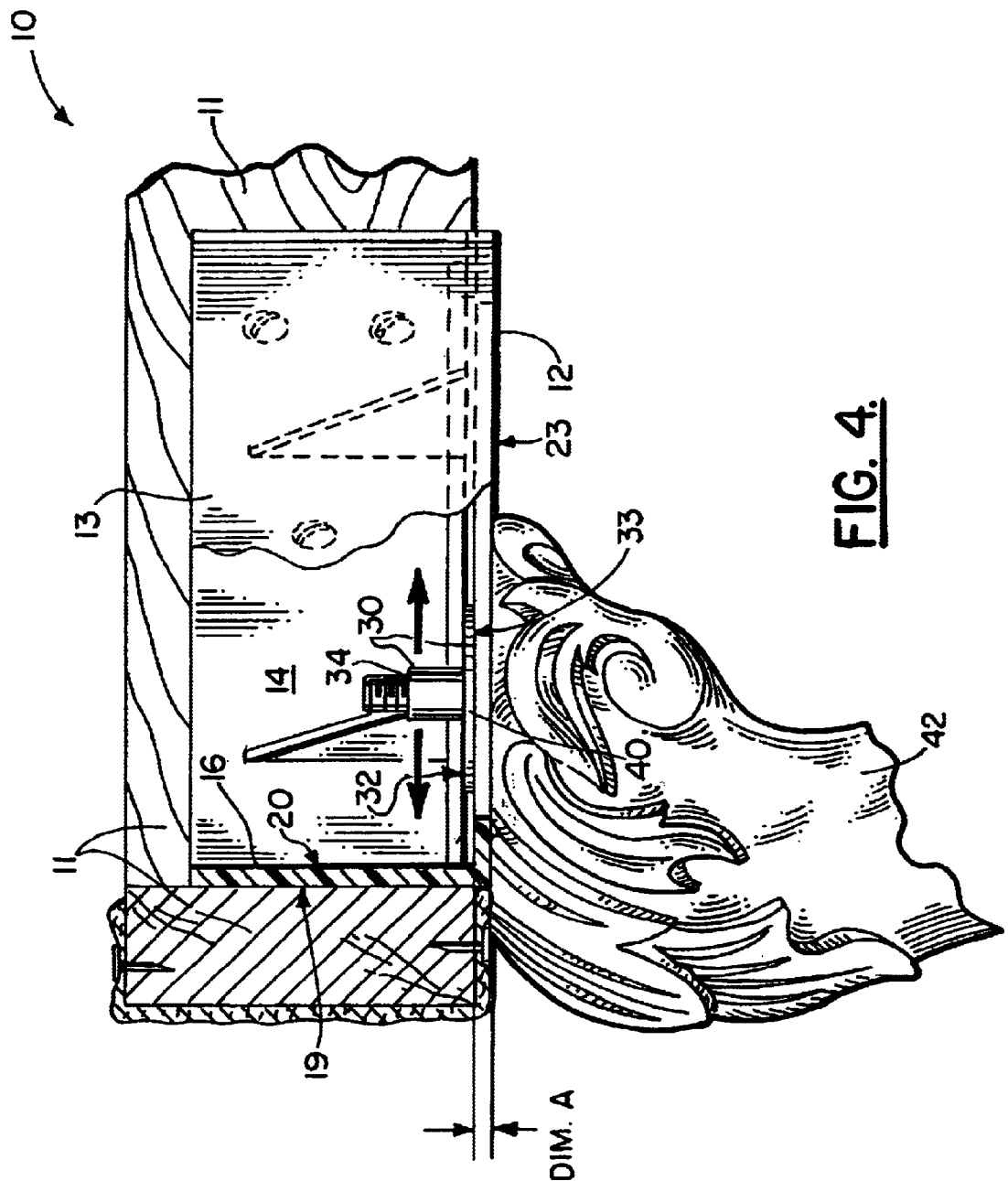
FIG. 4 is a side, partially cut away view of the first embodiment of the apparatus of the present invention.

Panel 13 has an outer surface 19 and an inner surface 20. Panel 14 has an outer surface 21 and an inner surface 22. Triangular panel 15 has an outer surface 23 and an inner surface 24. Each one of the panels 13, 14 and 15 can be reinforced with gusseting. Further, gussets can be used to reinforce the connection between each side panel 13, 14 and triangular panel 15. Gussets 25 and 26 are shown in FIG. 3.

Triangular panel 15 is almost cut in two with slot 18. Triangular panel 15 can be reinforced with ribs 27 that can extend in different directions as shown.

Figure 2:
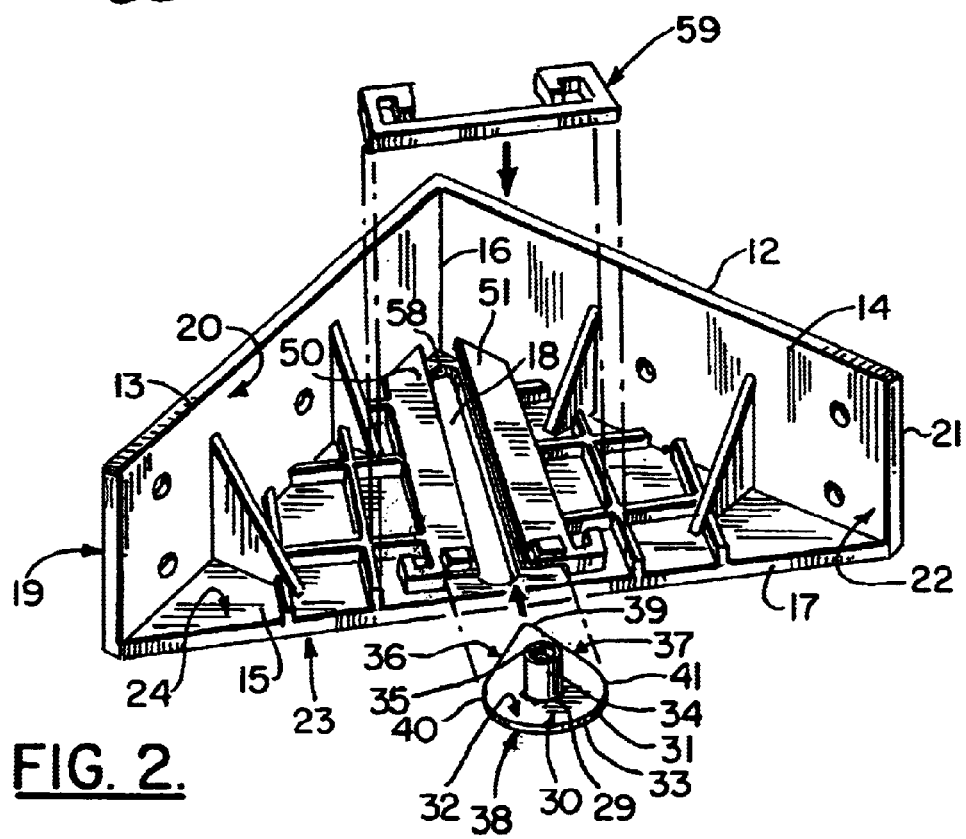
FIG. 2 is a perspective fragmentary view of the first embodiment of the apparatus of the present invention.

A shaped connector or nut 30 travels in slot 18 between positions next to corner 16 and a position next to edge 17. In FIG. 2, nut 30 has a periphery 31, a plate section 28 that has a first surface 32, a second surface 33, and a sleeve 34 that is preferably an internally threaded sleeve, providing an internally threaded bore 35. Sleeve 34 can be joined to late 28 at weld 29, for example. Surfaces 32, 33 can be flat, planar surfaces that define generally parallel planes.

The periphery 31 of nut 30 includes straight sides 36, 37, curved end portion 38, and pointed end portion 39. Nut 30 can have generally straight edges 40, 41 that engage corresponding straight surfaces of rails 50, 51. When inserted into slot 18, the pointed end portion 39 is positioned to engage corner 16. Curved end portion 38 is positioned to engage stop bar 59.

When the bracket 12 is attached to a furniture body 11, a furniture leg 42 of desired size and shape can be attached to bracket 12 by engaging the machine threads 46 of externally threaded stud 45 with the internally threaded bore 35 of threaded sleeve 34. Once threads 46 of stud 45 engage internally threaded bore 35 of sleeve 34 and before completely tightening the leg 42 against triangular panel 15, a user can select the position of the leg 42 relative to the furniture frame 11 by sliding the assembly of leg 42 and nut 30 in slot 18.

Once the selected position of leg 42 and nut 30 is reached relative to furniture frame 11 and bracket 12, the user simply tightens the threaded stud 45 and leg 42, assembly against nut 30 and triangular panel 15. In doing so, the upper surface 43 of leg 42 engages outer surface 23 of triangular panel 15.

Slot 18 provides a pair of slotted rails 50, 51 (see FIG., 7). Each slotted rail 50, 51 includes upper and lower flanges. Slotted rail 50 has upper flange 52 and lower flange 53. Slotted rail 51 has upper flange 54 and lower flange 55. Thus, each of the slotted rails 50, 51 provides an elongated slot 56, 57 respectively that receives the side portions of nut 30 next to straight side portions 36, 37.

A stop bar 59 provides a part that interlocks with triangular panel 15. The stop bar 59 can thus be removed for inserting or removing nut 30 from slot 18. The slot 18 is closed at end 58 next to corner 16.

Figure 5:
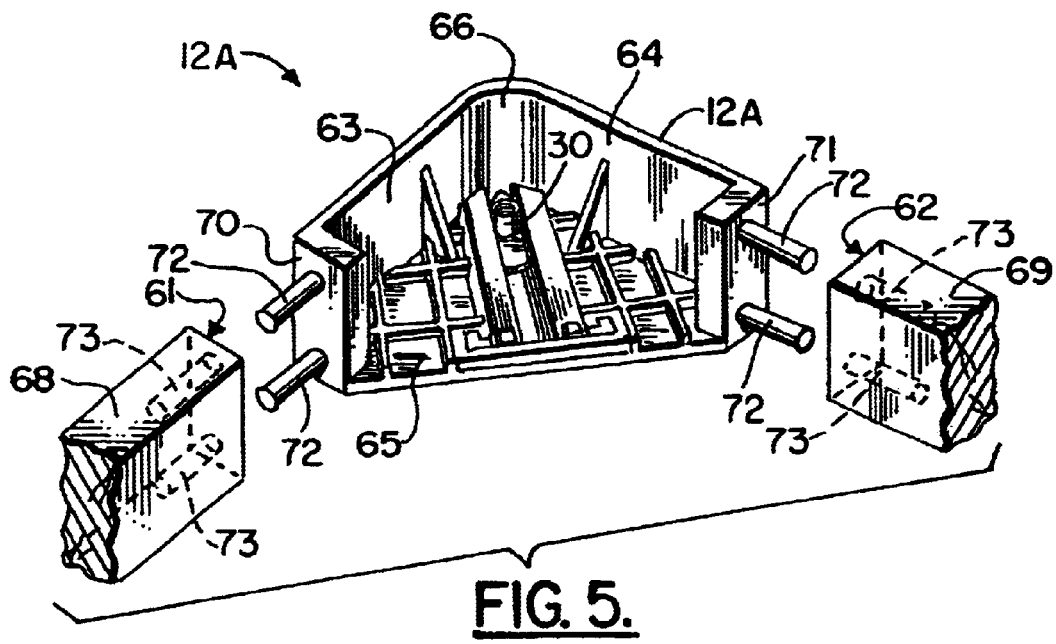
FIG. 5 is a plan view of a second embodiment of the apparatus of the present invention.
Figure 6:
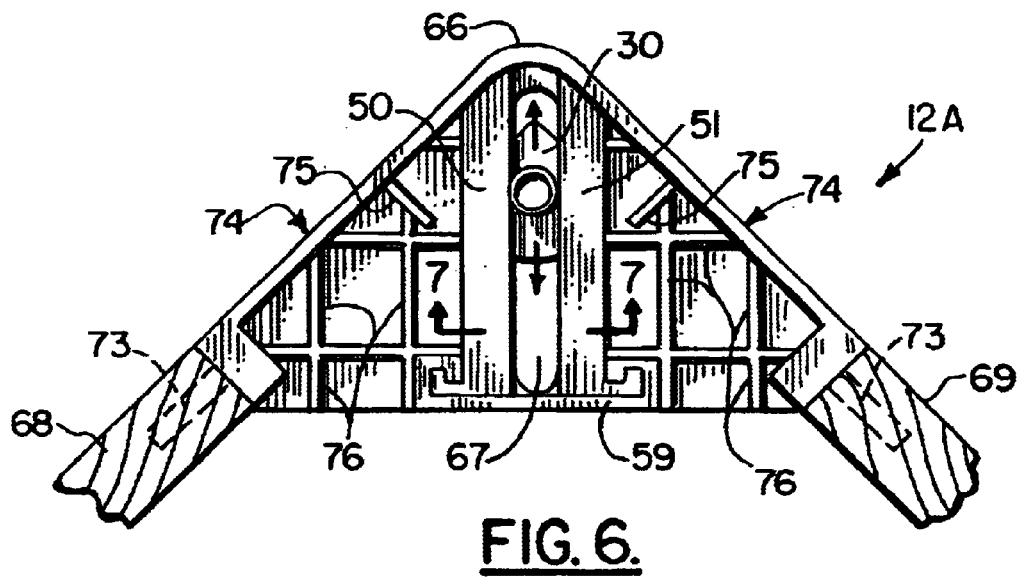
FIG. 6 is a perspective view of the second embodiment of the apparatus of the present invention.
Figure 7:
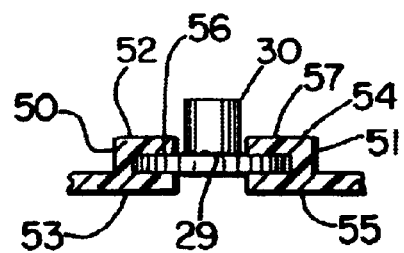
FIG. 7 is a fragmentary view of the nut portion of the first and second embodiments of the apparatus of the present invention.

FIGS. 5–6 show a second embodiment of the apparatus of the present invention in the form of an alternate bracket 12A that can form an attachment to a wooden furniture frame 11, but connects in a different manner than that shown and described with respect to FIGS. 1–4. In FIGS. 5 and 6, the wooden frame 11 can include beams 68, 69 that have been cut or milled to provide surfaces 61, 62 respectively to which bracket 12A attaches.

In FIG. 5, wooden beam 68 provides surface 61. Beam 69 provides surface 62. The surfaces 61, 62 are transverse, essentially vertical surfaces to which bracket 12A can be connected using fastener 72. Fastener 72 can be a dowel or dowels, screws, lag screws, bolts, staples, adhesives, or the like. Bracket 12A has side panel 63, 64 and a lower panel 65. The side panels 63, 64 meet at a curved corner 66 portion that provides the desired curvature for the particular furniture article to which the bracket 12A is attached, such as for example, the corner of a sofa, chair, or table. The beams 68, 69 can be the lower, longitudinally extending, generally horizontal beams that form a part of the wooden frame of an upholstered sofa, upholstered chair, or the like.

A slot 67 is provided that receives connector 30 that can be the nut 30 that was shown and described with respect to FIGS. 1–4 and 7. Sockets 73 can be milled or cut or drilled in to beams 68, 69 if the fastener 72 are dowels, screws, bolts, lag screws or the like.

The bracket 12A can provide gussets 75 and ribs 76 as with the bracket 12 of FIGS. 1–4. Similarly, the bracket 12A can provide rails 50, 51 that support connector 30 as it slides between positions next to curved corner 66 or stop bar 59.

In the embodiment of FIGS. 5 and 6, the outer surface 74 of bracket 12A can be for example "show wood" looking plastic. For example the bracket 12A can be made of injection molded plastic construction having a desired show wood appearance.

As with the embodiment of FIGS. 1–4 and 7, a furniture leg 42 attaches to the fastener or nut 30 using the threaded portion 46 of stud 45 that has been mounted in leg 42 at its upper surface 43 as shown in FIG. 3.

The following is a list of parts and materials suitable for use in the present invention:

PARTS LIST

| PART NO. | DESCRIPTION |
|---|---|
| 10 | furniture article |
| 11 | furniture frame |
| 12 | bracket |
| 12A | bracket |
| 13 | side panel |
| 14 | side panel |
| 15 | triangular panel |
| 16 | corner |
| 17 | edge |
| 18 | slot |
| 19 | outer surface |
| 20 | inner surface |
| 21 | outer surface |
| 22 | inner surface |
| 23 | outer surface |
| 24 | inner surface |
| 25 | gusset |
| 26 | gusset |
| 27 | rib |
| 28 | plate section |
| 29 | weld |
| 30 | nut |
| 31 | periphery |
| 32 | first surface |
| 33 | second surface |
| 34 | threaded sleeve |
| 35 | internally threaded bore |
| 36 | straight side |
| 37 | straight side |
| 38 | curved end |
| 39 | pointed end |
| 40 | edge |
| 41 | edge |
| 42 | leg |
| 43 | upper surface |
| 44 | lower surface |
| 45 | externally threaded stud |
| 46 | external threads |
| 47 | cut end |
| 48 | cut end |
| 49 | frame member |
| 50 | slotted rail |
| 51 | slotted rail |
| 52 | upper flange |
| 53 | lower flange |
| 54 | upper flange |
| 55 | lower flange |
| 56 | elongated slot |
| 57 | elongated slot |
| 58 | closed end |
| 59 | stop bar |
| 60 | frame member |
| 61 | surface |
| 62 | surface |
| 63 | side panel |
| 64 | side panel |
| 65 | lower panel |
| 66 | curved corner |
| 67 | slot |
| 68 | wooden beam |
| 69 | wooden beam |
| 70 | end panel |
| 71 | end panel |
| 72 | fastener |
| 73 | socket |
| 74 | outer surface |
| 75 | gusset |
| 76 | rib |

The foregoing embodiments are presented by way of example only; the scope of the present invention is to be limited only by the following claims.

What is claimed is:

1. A furniture article, comprising:
   a) a furniture frame having a lower portion;
   b) a bracket that is attached to the furniture body next to the lower portion, the bracket having a pair of surfaces that form a first angle, and a connector that is slidably attached to the bracket along a path that generally bisects the first angle to define a second angle with each of the pair of surfaces that is about one-half of the first angle;
   c) a leg that removably attaches to the bracket at the connector;
   d) wherein the assembly of furniture leg and connector are slidably adjustable relative to the furniture body between a first position and a second position; and
   e) wherein the connector is a flat planar member having a tubular, internally threaded sleeve that is attached to the flat planar member.

2. The furniture article of claim 1 wherein the bracket is comprised of a pair of side panels and a triangular panel that is joined to each of the side panels.

3. The furniture article of claim 2 wherein the side panels form an angle about 90 degrees.

4. The furniture article of claim 1 wherein there area plurality of said brackets attached to the furniture frame and a plurality of legs attached to the frame, one leg attached to each bracket.

5. The furniture article of claim 1 wherein the bracket is of an injection molded plastic construction.

6. The furniture article of claim 1 wherein the furniture frame is an upholstered furniture frame.

7. The furniture article of claim 1 wherein the furniture frame is at least partially covered with upholstery and wherein the leg has an upper surface, the upper surface of the leg and the bracket having a gap therebetween for receiving part of the upholstery.

8. An upholstered furniture article, comprising:
   a) a furniture article having a wooden frame and upholstery that covers at least part of the wooden frame;
   b) a bracket that is attachable to the frame, the bracket having a pair of side panels that form a first angle, a transverse panel and a slot that forms an angle smaller than the first angle;
   c) a nut that is slidably attached to the bracket at the slot;
   d) a leg that removably attaches to the bracket at the nut; and
   d) wherein the assembly of furniture leg and nut are slidably adjustable relative to the frame between a first position and a second position.

9. The furniture article of claim 8 wherein the transverse panel is a triangular panel that has diagonal edges, each joined to one of the side panels.

10. The furniture article of claim 9 wherein the side panels form an angle about 90 degrees.

11. The furniture article of claim 8 wherein there are a plurality of said brackets attached to the furniture frame and a plurality of legs, one leg attached to each bracket.

12. The furniture article of claim 8 therein the bracket includes gussets that each span between a side panel and panel.

13. The furniture article of claim 8 wherein a part of the upholstery fits in between the bracket and the leg.

14. The furniture article of claim 8 wherein the frame is at least partially covered with upholstery and wherein the leg has an upper surface, the upper surface of the leg and the bracket having a gap there between for receiving part of upholstery.

15. The furniture article of claim 8 wherein the nut includes a plate member and a tubular, internally threaded sleeve that is attached to the plate member.

* * * * *